March 4, 1952 R. H. HUNTER 2,588,242
SILENT BALL COCK
Filed Sept. 25, 1945 2 SHEETS—SHEET 1

Inventor
Rutherford H. Hunter
By Frease and Bishop
Attorneys

March 4, 1952   R. H. HUNTER   2,588,242
SILENT BALL COCK
Filed Sept. 25, 1945   2 SHEETS—SHEET 2

Inventor
Rutherford H. Hunter
By Frease and Bishop
Attorneys

Patented Mar. 4, 1952

2,588,242

UNITED STATES PATENT OFFICE 2,588,242

SILENT BALL COCK

Rutherford H. Hunter, Wooster, Ohio

Application September 25, 1945, Serial No. 618,504

7 Claims. (Cl. 137—104)

1

The invention relates to an improved ball cock or valve for controlling the flow of water into a water closet flush tank for filling the same, and this application is a continuation in part of my copending application Serial No. 575,058, filed January 29, 1945, and now abandoned.

Prior constructions have been noisy due to vibration or water hammer, and have been so constructed that they cause wear or clogging of the working parts, resulting in faulty operation or failure of performance.

Attempts have been made toward overcoming these disadvantages, but in many cases the result has been to provide an expensive and complicated construction which is impractical.

It is an object of the present invention to provide a simple ball cock construction which is quiet and efficient in operation.

Another object is to provide a novel ball cock which is so constructed as to prevent substantially any wear on the working parts.

A further object is to provide a novel ball cock which eliminates vibration or water hammer.

Another object is to provide a novel ball cock which is so constructed as to prevent clogging of foreign material within the ball cock, which would interfere with or prevent its operation.

It is a still further object of the present invention to incorporate all of the foregoing objectives in a compact and inexpensive structure.

These and other objects are accomplished by the present improvements, a preferred embodiment of which is shown by way of example in the accompanying drawings, and hereinafter described and claimed.

Referring to the drawings forming part hereof:

Similar numerals refer to similar parts throughout the several views of the drawing.

Figure 1:
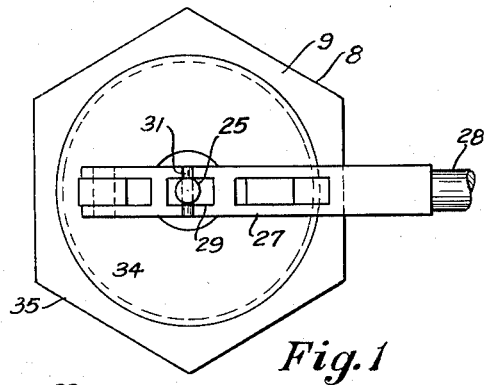
Figure 1 is a plan view of a preferred embodiment of the improved ball cock or valve.
Figure 4:
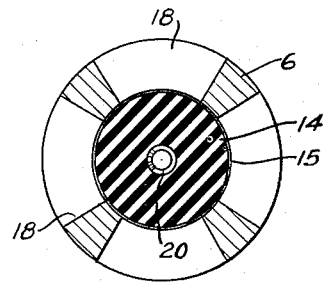
Fig. 4 is a cross sectional view as on line 4—4, Fig. 3.

The improved ball cock or valve, shown in Figs. 1 to 5 inclusive, preferably includes a tubular body indicated at 6 and provided with external threads 7 on its lower end for extending through the bottom of a flush tank and making connection with a water supply pipe in a usual manner, there being a suitable gasket and clamping means provided for sealing the opening through the bottom of the tank around the tubular body 6. Such construction is well known and provides a support for the ball cock in a flush tank.

The upper portion of the tubular body 6 is provided with an enlarged cup-shaped portion 8, and the bottom end 9 of a pilot valve housing 10 is screwed into said portion 8 to form a pressure chamber 11. A diaphragm valve 12 of rubber or other flexible material is located between the pressure chamber 11 and the upper end of the bore 13 of the body 6, and the diaphragm valve 12 has a thickened body portion 14 depending therefrom and fitting in a socket 15 which is formed in the upper part of the body 6 and communicates with the bore 13.

An annular preferably conical seat 16 is formed in the socket 15 around the bore 13, and the bottom of the central body 14 of the diaphragm is provided with a complementary conical seating surface 17. Preferably at intervals around the socket 15, the body portion is provided with radially extending discharge ports 18 for discharging water from the bore 13 into the flush tank when the diaphragm valve 12 is in open position. The outer rim 19 of the diaphragm valve 12 is preferably beveled as shown and engaged by a beveled surface on the bottom 9 of the housing 10 so as to securely hold the diaphragm valve 12 in position when the housing 10 is screwed into the cup-shaped portion 8 of the body.

The central portion 14 of the diaphragm valve 13 is provided with a conical aperture 20 extending therethrough, and having its larger end uppermost. This aperture permits a small amount of water to flow through the diaphragm into the pressure chamber 11, and is made conical in form to prevent foreign material from becoming clogged in the aperture. The flexibility or elasticity of the diaphragm valve, in the area thereof surrounding its central portion, permits a limited up and down movement of the central portion 14 toward and away from the conical seat 16.

A pilot valve indicated at 21 is located in the housing 10 and controls the discharge of water from the pressure chamber 11 through the central bore 22, in which the valve is movably mounted, and thence to the fill line pipe 23 which communicates with the fill line chamber 24 in the upper portion of the housing 10.

The fill line pipe 23 conducts water to an overflow pipe and thence to the toilet bowl in a usual fashion, and the construction and function of the overflow and fill line are well known and are therefore not shown.

The pilot valve 21 is provided with a stem 25 which extends through the fill line chamber 24 and projects upwardly therefrom as shown for making connection with the lever arm 27 which is actuated by the usual float (not shown) attached to the end of rod 28. Preferably the valve stem 25 extends through a slot 29 in the lever 27, and is provided with a cross pin 30 under the lever 27 and a cross pin 31 above the lever 27. The lever 27 is preferably pivoted at its inner end as shown at 32 to a suitable projection 33 on the closure plate 34 which is screwed into the annular flange 35 on the upper end of the housing 10.

Figure 2:
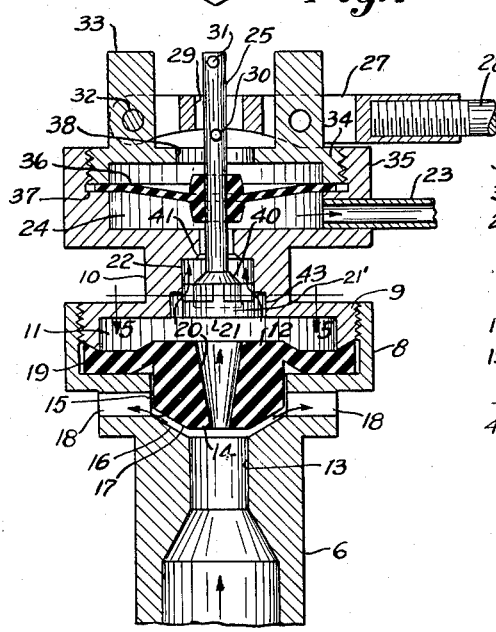
Fig. 2 is a vertical sectional view of the improved ball cock or valve of Fig. 1 in open position, parts being broken away.
Figure 3:
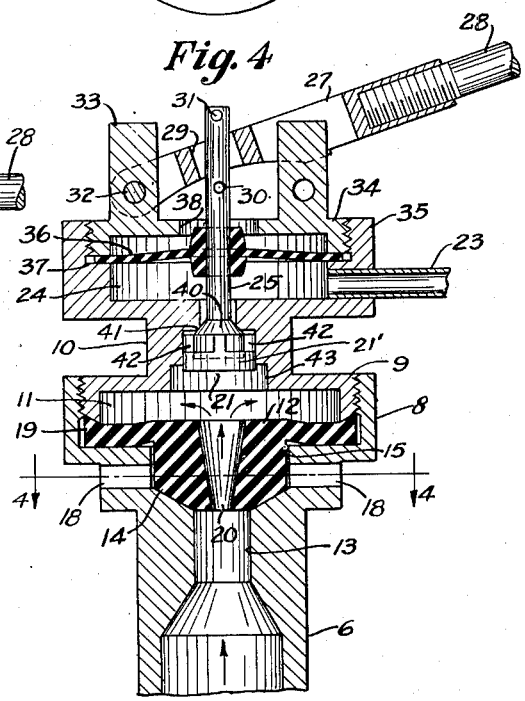
Fig. 3 is a similar view of the valve in closed position.
Figure 5:
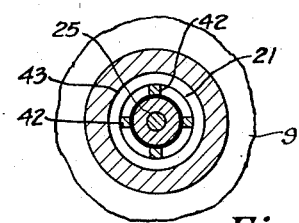
Fig. 5 is a fragmentary cross sectional view as on line 5—5, Fig. 2.
Figure 6:
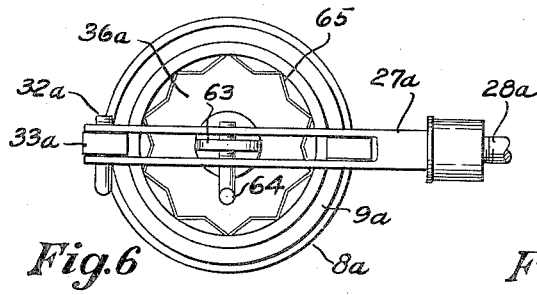
Fig. 6 is a plan view of a modified embodiment of the invention.
Figure 8:
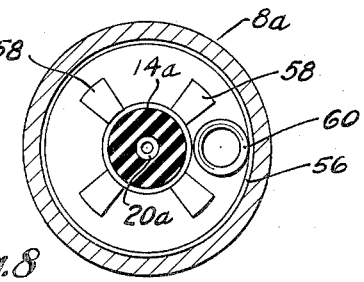
Fig. 8 is a cross sectional view as on line 8—8, Fig. 7.
Figure 7:
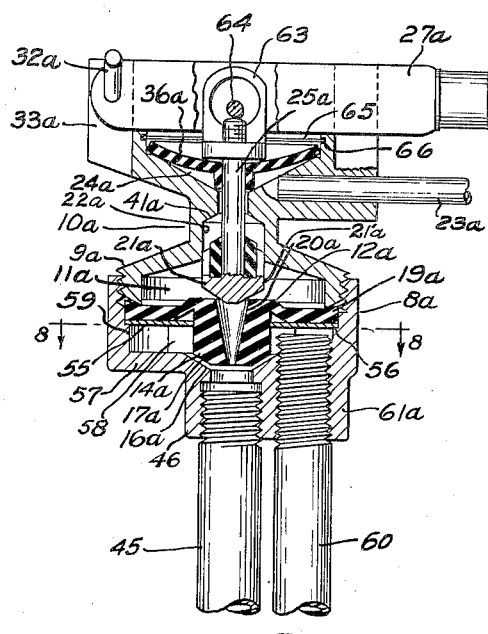
Fig. 7 is a vertical sectional view thereof in open position.

Thus, when the float rod 28 drops due to the removal of water from the flush tank, it engages the pin 30 to move the pilot valve downwardly to the open position of Fig. 2, and when the water in the flush tank raises the float, the lever 27 engages pin 31 to move the pilot valve to the closed position of Fig. 3.

Preferably, a diaphragm partition 36 is attached to the valve stem 25 in the fill line chamber 24, and its outer rim is clamped by the closure plate 34 against a shoulder 37 provided in the annular flange 35, so as to securely hold the outer rim of the diaphragm as the valve stem 25 moves up and down. The diaphragm partition 36 thus prevents any leakage of water passing through the bore 22 into chamber 24 and thence to the fill line 23, and enables the valve stem 25 to extend through a large opening 38 in the closure plate 34 without requiring any packing or other sealing means which would frictionally resist movement of the pilot valve.

The head of the pilot valve 21 is provided on its upper surface with a beveled seating surface 40 for closing off the valve port by engaging the annular shoulder 41 around the same, when the valve is moved to closed position as shown in Fig. 3.

The head 21' of the pilot valve 21 is cylindrical and is of such diameter as to have a loose sliding fit with the bore 22 of the housing 10. Projecting upwardly from the cylindrical head 21' are a plurality of circumferentially spaced ribs 42 loosely engaging the bore 22 when the valve is in either open or closed position. As indicated by the arrows in Fig. 2, when the valve is in open position, water flows through the enlarged bore 43 around the cylindrical head 21' of the pilot valve 21 and between the ribs 42 into the bore 22 and thence to the fill line chamber 24. In the closed position of the pilot valve as shown in Fig. 3 the head of valve 21 engages the seat 41 and prevents such flow.

In the operation of the improved ball cock, assuming that the water in the tank has been discharged so that the float rod 28 has dropped to the position of Fig. 2, the weight of the float has forced the pilot valve off its seat 41 to the position shown in Fig. 2, and this allows water to flow from the pressure chamber through the fill line 23 and relieves the pressure on the upper side of the diaphragm valve 12. The pressure of the incoming water through the bore 13 will then lift the body portion of the diaphragm to the position of Fig. 2 so that most of the incoming water can escape through the radial ports 18 and fill the flush tank. At the same time, a small portion of the incoming water flows through the conical aperture 20 and around the pilot valve to and through the fill line 23, so as to increase the depth of the water seal in the toilet bowl while the tank is filling.

When the water level in the tank rises sufficiently to move the float rod upwardly and engage the lever arm 27 with the pin 31, the valve stem 25 is urged upwardly to move the pilot valve 21 to closed position. As the pilot valve 21 is lifted by the float rod 28 and the cylindrical head 21' of the valve approaches its entry into the bore 22, the supply to water passages 21 between the ribs 42 is largely closed, so that the increasing resistance to the flow of water therethrough increases the pressure on the bottom of the pilot valve 21 and causes the same to snap shut.

This sudden closing of the pilot valve prevents any scouring action on the valve seat which might be present if the valve closed gradually, and tends to eliminate noise or vibration incident thereto.

As soon as the pilot valve is snapped shut, the flow of water through the aperture 20 immediately increases the water pressure on the upper side of the diaphragm valve 12, and due to the fact that the upper surface is much greater in area than the lower surface which is being subjected to the pressure of the incoming water, the total force on the upper side of the diaphragm valve will quickly increase and move the body portion 12 downwardly against the conical seat 16 and shut off the flow of the incoming water. The valve then remains in the closed position of Fig. 3 with both the diaphragm valve 12 and the pilot valve 21 being closed under pressure, until the tank is again discharged, causing the float to drop and open the pilot valve.

In the embodiment of the novel ball cock shown in Figs. 6 to 9 inclusive, the diaphragm valve is adapted to be located in the upper part of a flush tank so as to be above the water level therein. Thus, the cup-shaped housing 8a enclosing the rubber diaphragm valve 12a is supported on a vertical water inlet pipe 45, the upper end of which is screwed into a boss 46 formed on the bottom of the housing 8a, and the lower end of which is connected to a nut 47 on the upper end of a threaded connector 48 which extends through an opening 49 in the bottom wall 50 of the flush tank.

A suitable washer 51 of rubber and the like is interposed between the flange 52 of the nut 47 and the tank wall 50, and a similar washer 53 is interposed between the tank wall 50 and a clamping nut 54, so as to form a water tight seal at the tank wall around the connector 48, the lower end of which is connected with a water supply pipe in a usual manner.

In this embodiment of the invention, the diaphragm valve 12a is supported on a metal plate 55 which rests at its outer edge on an annular shoulder 56 formed in the side wall of housing 8a and spaced above the bottom wall 57 thereof. The central portion of the plate 55 around the body portion 14a of the diaphragm valve is supported by four circumferentially spaced columns 58. Thus, when the seating surface 17a of the body portion 14a is lifted off the seat 16a in the open position of Fig. 7, water from the pipe 45 discharges radially outward between the columns 58 into the annular chamber 59 formed in the housing below the plate 55.

Means for discharging water from the annular chamber 59 into the flush tank, in this embodiment includes a vertical depending pipe 60 the lower end 61 of which is located close to the tank bottom wall 50, so as to always discharge water into the tank in such manner as to avoid splashing and noise. The upper end of the pipe 60 is screwed through a boss 61a into the discharge chamber 59, and provides an adjustable outlet port between the upper end of the pipe 60 and the plate 55, whereby screwing the pipe 60 up or down will adjust the space between the upper end of the pipe and the plate 55 to obtain the desired discharge volume with minimum vibration or noise.

The bottom end 9a of the pivot housing 10a is screwed into the housing wall 8a, forming a pressure chamber 11a above the diaphragm valve and clamping the outer rim 19a of the valve. The body portion 14a of the diaphragm valve is provided with a conical aperture 20a which functions in the same manner as the aperture 20 in the embodiment of Figs. 1 to 5. The height of the body portion 14a is materially greater than the vertical distance from the seat 16a to the plate 55, as clearly shown in the drawings, so that when the rim 19a of the diaphragm valve is clamped against the plate 55 the seat 16a forces the body portion 14a upwardly, and the tension of the rubber tends to hold the body portion against the seat 16a.

The pilot valve housing 10a has the pilot valve 21a therein for controlling the discharge of water from the pressure chamber 11a to the fill line chamber 24a and thence to the fill line pipe 23a which conducts water to the overflow pipe of the flush tank in a usual manner. The stem 25a of the pilot valve preferably has screwed on its upper end a ring member 63 through which a pin 64 is inserted, and the pin 64 extends through the lever arm 27a to which is attached the float rod 28a forming a lost motion connection between the pilot valve and lever arm. The other end of the lever arm 27a is pivoted to a projection 33a on the pilot valve housing by means of a pivot pin 32a.

Figure 9:
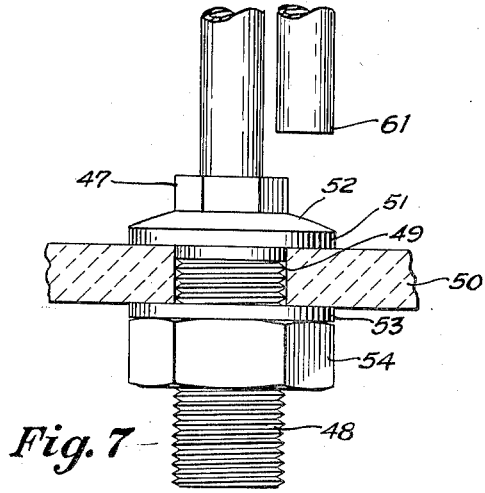
Fig. 9 is a fragmentary vertical sectional view similar to Fig. 7, showing the valve in closed position.

When the float rod 28a moves to normal raised position due to the float being supported at the water level in the flush tank, the pin 64 engages the upper side of the ring 63, to move the pilot valve 21a upwardly. As the pilot valve 21a is moved upwardly toward closed position and the cylindrical head 21a' approaches the point of entry into the bore 22a, the supply to water passages between the ribs 42a become substantially closed so as to set up resistance to the flow of water between the ribs and increase the pressure on the bottom of the pilot valve 21a causing it to snap shut, in which position the upper beveled end of the rubber insert 40a seats on the conical shoulder 41a. As shown in Fig. 9, when the pilot valve has snapped shut, the ring member 63 has moved above the pin 64.

The stem 25a of the pilot valve has a rubber diaphragm partition 36a attached thereto immediately below the ring member 63, and the diaphragm partition is retained in the upper end of the chamber 24a by means of a wire snap retaining ring 65 which may be of polygonal shape as shown, and is seated in a groove 66 in the upper end of the pilot valve housing.

The operation of the embodiment of Figs. 6 to 9 inclusive, is substantially the same as the embodiment of Figs. 1 to 5 inclusive, the main difference between the two embodiments being in the elevation of the diaphragm valve above the bottom wall of the tank, and the construction of the housing 8a forming the chamber 59 with the depending discharge pipe 60 communicating therewith.

The embodiment of Figs. 6 to 9 inclusive, is non-siphoning because of the diaphragm valve body 14a being held against seat 16a by the tension of the rubber diaphragm. Thus, when the tank is full of water and the valve in closed position as in Fig. 9, if the water supply in pipe 45 should stop and tend to create a vacuum in the pipe 45 and in chamber 11a, the vacuum would tend to lift the diaphragm valve off its seat due to the greater area of its upper surface, and the water from the tank would siphon through pipe 60 past valve seat 16a and into pipe 45. The tension in the diaphragm is sufficient to maintain the body 14a on its seat 16a and overcome the lifting effect of the vacuum until the decreased pressure in chamber 11a causes the pilot valve 21a to move downwardly (until ring 63 engages pin 64) and admit air into said chamber, which increases the seating pressure on the valve body.

The embodiment of Figs. 1-5 operates in the same manner, but since the discharge ports 18 are above the level of the water in the tank when filled, the danger of siphoning is not normally present.

The relatively large conical seating surfaces 16 and 17 or 16a and 17a for the diaphragm valve insure a tight closure without cutting into the diaphragm, which insures long wear without replacement, and the resiliency of the diaphragm promotes maximum silence in operation.

The improved ball cock provides a compact and inexpensive construction which eliminates vibration and noise, and which operates quietly without clogging over long periods of time.

I claim:

1. Valve construction for flush tanks and the like including a body having a pressure chamber, a supply tube communicating with said pressure chamber, a centrally apertured diaphragm valve biased to closed position separating said supply tube and chamber, a float having an arm, and a float actuated pilot valve controlling the discharge from said pressure chamber to a fill line chamber and having a stem extending through said fill line chamber, a lost motion connection between the float arm and pilot valve stem, said diaphragm valve having a central depending body portion, an annular seat in the valve body cooperating with said body portion for closing the supply tube, means on said pilot valve for causing snap action of the valve during its closing movement and moving the pilot valve stem out of contact with the float arm, whereby a partial vacuum in the pressure chamber will unseat the pilot valve and relieve said vacuum while said diaphragm valve remains biased to closed position, and a diaphragm partition attached to said pilot valve stem in said fill line chamber.

2. Valve construction for flush tanks and the like including a body having a pressure chamber, a supply tube communicating with said pressure chamber, a centrally apertured diaphragm valve biased to closed position separating said supply tube and chamber, a float having an arm, and a float actuated pilot valve controlling the discharge from said pressure chamber to a fill line chamber, a lost motion connection between the float arm and pilot valve, said diaphragm valve having a central depending body portion, an annular seat in the valve body cooperating with said body portion for closing the supply tube, and means on said pilot valve for causing snap action of the valve during its closing movement and moving the pilot valve out of contact with the float arm, whereby a partial vacuum in the pressure chamber will unseat the pilot valve and relieve said vacuum while said diaphragm valve remains biased to closed position.

3. Valve construction for flush tanks and the like including a body having a pressure chamber communicating with a supply passage and a centrally apertured diaphragm valve biased to closed position between said chamber and passage, a fill line chamber communicating with said pressure chamber, a float having an arm, a float actuated pilot valve controlling the discharge from said pressure chamber to said fill line chamber, a lost motion connection between the float arm and pilot valve, means on said pilot valve for causing snap action of the valve moving it out of contact with the float arm during its closing movement whereby a partial vacuum in said pressure chamber will unseat said pilot valve while said diaphragm valve remains biased to closed position, said valve body having a socket providing communication between said supply passage and pressure chamber, a seating portion on said diaphragm valve for seating in said socket, and said valve body having radial ports extending outwardly from said socket for discharging water from the supply passage into the tank when the diaphragm is unseated.

4. Valve construction for flush tanks and the like including a housing, a flexible diaphragm valve forming a pressure chamber and a discharge chamber within said housing, a supply pipe communicating with said discharge chamber, a discharge duct communicating with said discharge chamber, said diaphragm valve having a depending apertured body portion biased for normally closing off said supply pipe from the discharge chamber, a float having an arm, a float actuated pilot valve controlling the discharge from said pressure chamber, a lost motion connection between the float arm and pilot valve, and means on said pilot valve for causing snap action of the valve during its closing movement and moving the pilot valve out of contact with the float arm, whereby a partial vacuum in the pressure chamber will unseat the pilot valve while said diaphragm valve remains biased to closed position.

5. Valve construction for flush tanks and the like including a valve body having a pressure chamber, a supply tube communicating with said pressure chamber, a centrally apertured diaphragm valve biased to closed position separating said supply tube and chamber, a float having an arm, and a float actuated pilot valve controlling the discharge from said pressure chamber to a fill line chamber, a lost motion connection between the float arm and pilot valve, said diaphragm valve having a central depending body portion, an annular seat in the valve body cooperating with said body portion for closing the supply tube, said pilot valve having a head, said valve body having a bore for slidably receiving the pilot valve head, circumferentially spaced ribs projecting upwardly from the pilot valve head and slidably fitting in said bore causing the pilot valve to close with a snap action and move said valve out of contact with said float arm, and a beveled seating surface within said ribs for closing off the upper end of the bore when the pilot valve is closed.

6. Valve construction for flush tanks and the like including a housing, a resilient diaphragm valve forming a pressure chamber and a discharge chamber within said housing, a conical valve seat in said discharge chamber, a supply pipe communicating with said discharge chamber through said seat, a depending discharge pipe providing communication between said discharge chamber and the tank, and said diaphragm valve having a depending apertured body portion with a conical seating surface so constructed and arranged as to be normally held under tension in position closing off said supply from said discharge chamber, to prevent siphoning of the water in the tank into the supply pipe in case the water supply is shut off when the tank is full of water.

7. Valve construction for flush tanks and the like including a housing, a resilient diaphragm valve forming a pressure chamber and a discharge chamber within said housing, a conical valve seat in said discharge chamber, a supply pipe communicating with said discharge chamber through said seat, a discharge duct providing communication between said discharge chamber and the tank, and said diaphragm valve having a depending apertured body portion with a conical seating surface so constructed and arranged as to be normally held under tension in position closing off said supply from said discharge chamber, to prevent siphoning of the water in the tank into the supply pipe in case the water supply is shut off when the tank is full of water.

RUTHERFORD H. HUNTER.

REFERENCES CITED

The following references are of record in the file of this patent:

UNITED STATES PATENTS

| Number | Name | Date |
|--------|------|------|
| 269,886 | Semple | Jan. 2, 1883 |
| 595,061 | Gulland | Dec. 7, 1897 |
| 654,522 | Corvey | July 24, 1900 |
| 858,063 | Delany | June 25, 1907 |
| 894,734 | Haas | July 28, 1908 |
| 1,333,646 | Watrous | Mar. 16, 1920 |
| 1,964,921 | Lundberg | July 3, 1934 |
| 2,213,753 | Teahen | Sept. 3, 1940 |
| 2,228,552 | Arbogast | Jan. 14, 1941 |
| 2,394,911 | Griswold | Feb. 12, 1946 |